(12) United States Patent
Yang et al.

(10) Patent No.: US 9,915,020 B2
(45) Date of Patent: Mar. 13, 2018

(54) WASHING MACHINE AND CONTROL METHOD THEREOF

(71) Applicant: LG ELECTRONICS INC., Seoul (KR)

(72) Inventors: Jeong Hwa Yang, Seoul (KR); Ja Hee Sohn, Seoul (KR); You Jin Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 291 days.

(21) Appl. No.: 14/758,129

(22) PCT Filed: Dec. 27, 2013

(86) PCT No.: PCT/KR2013/012247
§ 371 (c)(1),
(2) Date: Jun. 26, 2015

(87) PCT Pub. No.: WO2014/104775
PCT Pub. Date: Jul. 3, 2014

(65) Prior Publication Data
US 2015/0330008 A1    Nov. 19, 2015

(30) Foreign Application Priority Data

Dec. 28, 2012 (KR) ........................ 10-2012-0156992

(51) Int. Cl.
*G05B 13/00* (2006.01)
*G05B 15/00* (2006.01)
(Continued)

(52) U.S. Cl.
CPC ........... *D06F 39/005* (2013.01); *G05B 15/02* (2013.01); *D06F 33/02* (2013.01); *D06F 39/14* (2013.01);
(Continued)

(58) Field of Classification Search
CPC ........ D06F 33/02; D06F 39/005; D06F 39/39; D06F 2204/10; D06F 2202/12; G05B 15/02
See application file for complete search history.

(56) References Cited

U.S. PATENT DOCUMENTS

2009/0121970 A1    5/2009  Ozbek
2012/0036900 A1    2/2012  Hong et al.
(Continued)

FOREIGN PATENT DOCUMENTS

CN         1553974 A    12/2004
CN       101035945 A     9/2007
(Continued)

*Primary Examiner* — Mohammad Ali
*Assistant Examiner* — MD Azad
(74) *Attorney, Agent, or Firm* — Dentons US LLP

(57) ABSTRACT

A washing machine is disclosed. The washing machine includes a sensing unit to sense various kinds of inputs, an output unit to display an operation state of the washing machine, a door display unit disposed at a door to display a light pattern, a memory to store a plurality of input information corresponding to a plurality of commands, and a controller to determine whether the sensed input matches with any one of the input information when the sensing unit senses an external input, and control at least one of the output unit and the door display unit to be driven in response to the matched input information.

9 Claims, 6 Drawing Sheets

(51) Int. Cl.
  *G05D 23/00*     (2006.01)
  *G01M 1/38*      (2006.01)
  *G05B 19/00*     (2006.01)
  *D06F 39/00*     (2006.01)
  *G05B 15/02*     (2006.01)
  *D06F 33/02*     (2006.01)
  *D06F 39/14*     (2006.01)

(52) U.S. Cl.
  CPC ...... *D06F 2202/12* (2013.01); *D06F 2204/10* (2013.01); *D06F 2216/00* (2013.01)

(56) References Cited

U.S. PATENT DOCUMENTS

2012/0232903 A1\* 9/2012 Cenedese ............ A47L 15/4293
                                                    704/246
2012/0327201 A1 12/2012 Kappler et al.
2013/0106586 A1\* 5/2013 Vidal .................... G05B 15/02
                                                    340/12.22

FOREIGN PATENT DOCUMENTS

| CN | 101086125 A    | 12/2007 |
| CN | 102409508 A    | 4/2012  |
| DE | 10144668 A1    | 3/2003  |
| DE | 102007061522 A1| 6/2009  |
| JP | 11244575 A     | 9/1999  |
| JP | 2011156244 A   | 8/2011  |
| JP | 2012130379 A   | 7/2012  |
| WO | 2005118936 A1  | 12/2005 |

\* cited by examiner

[Fig. 1]
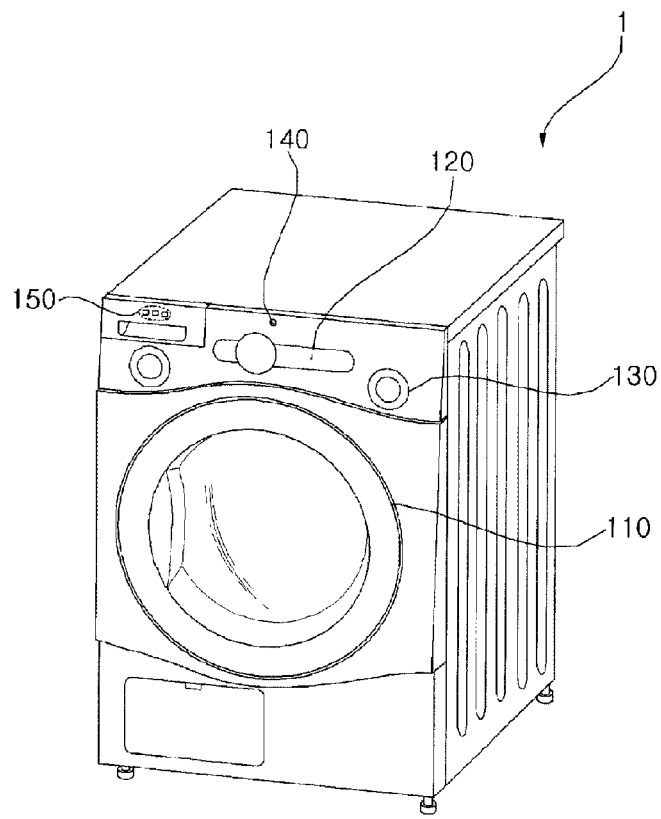
[Fig. 2]
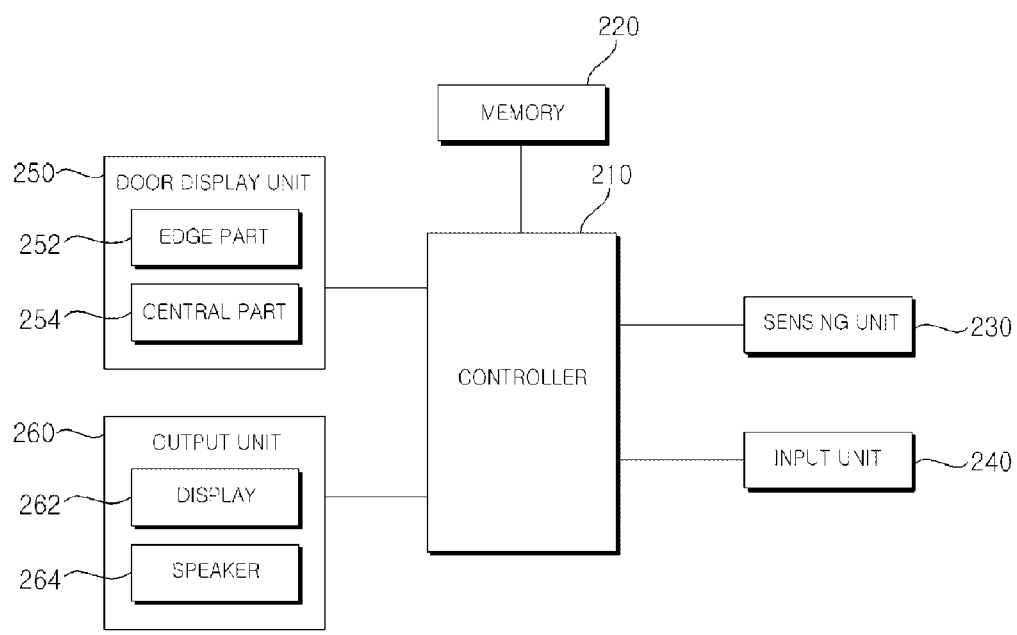

[Fig. 3]
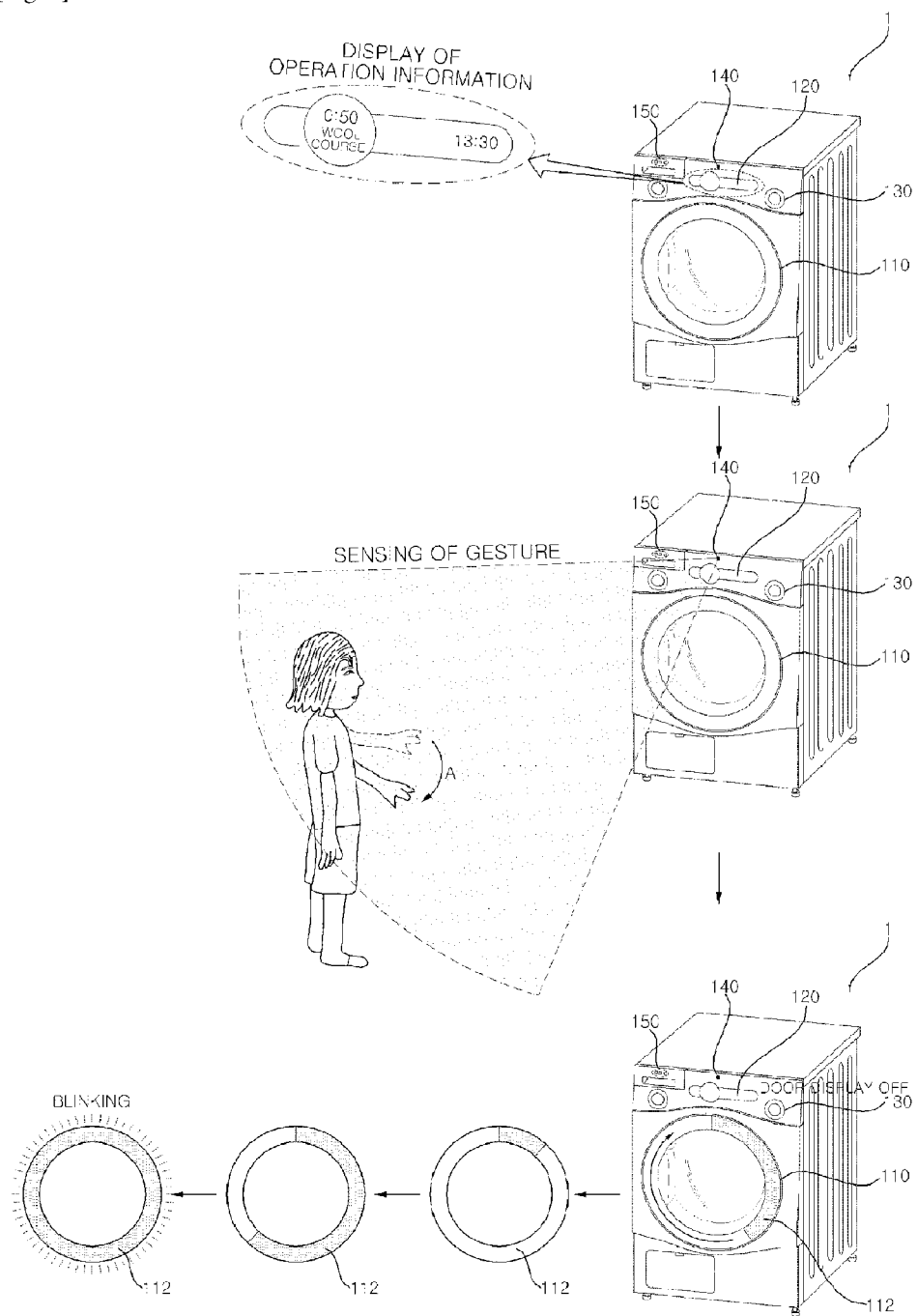

[Fig. 4]
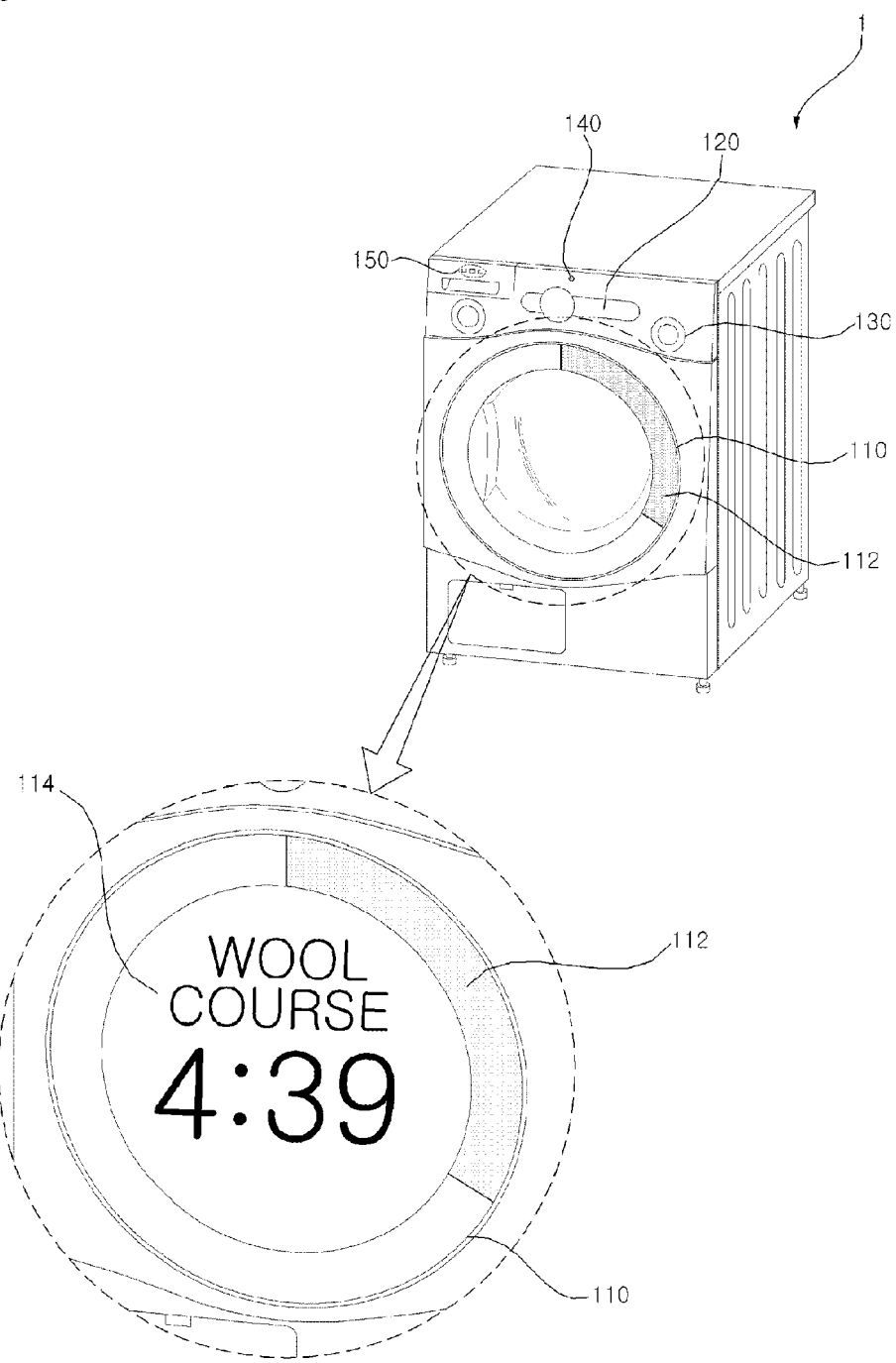

[Fig. 5]
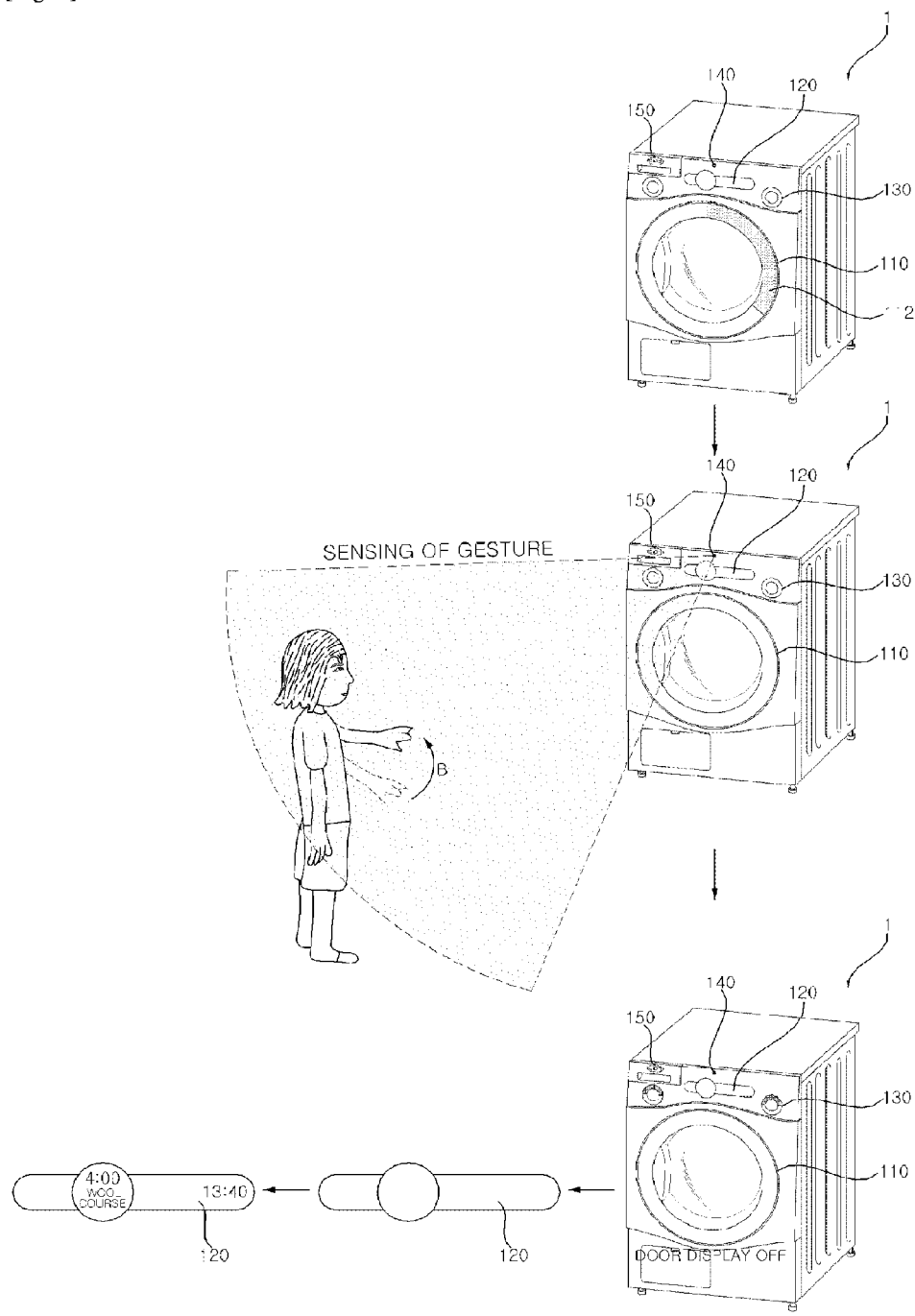

[Fig. 6]
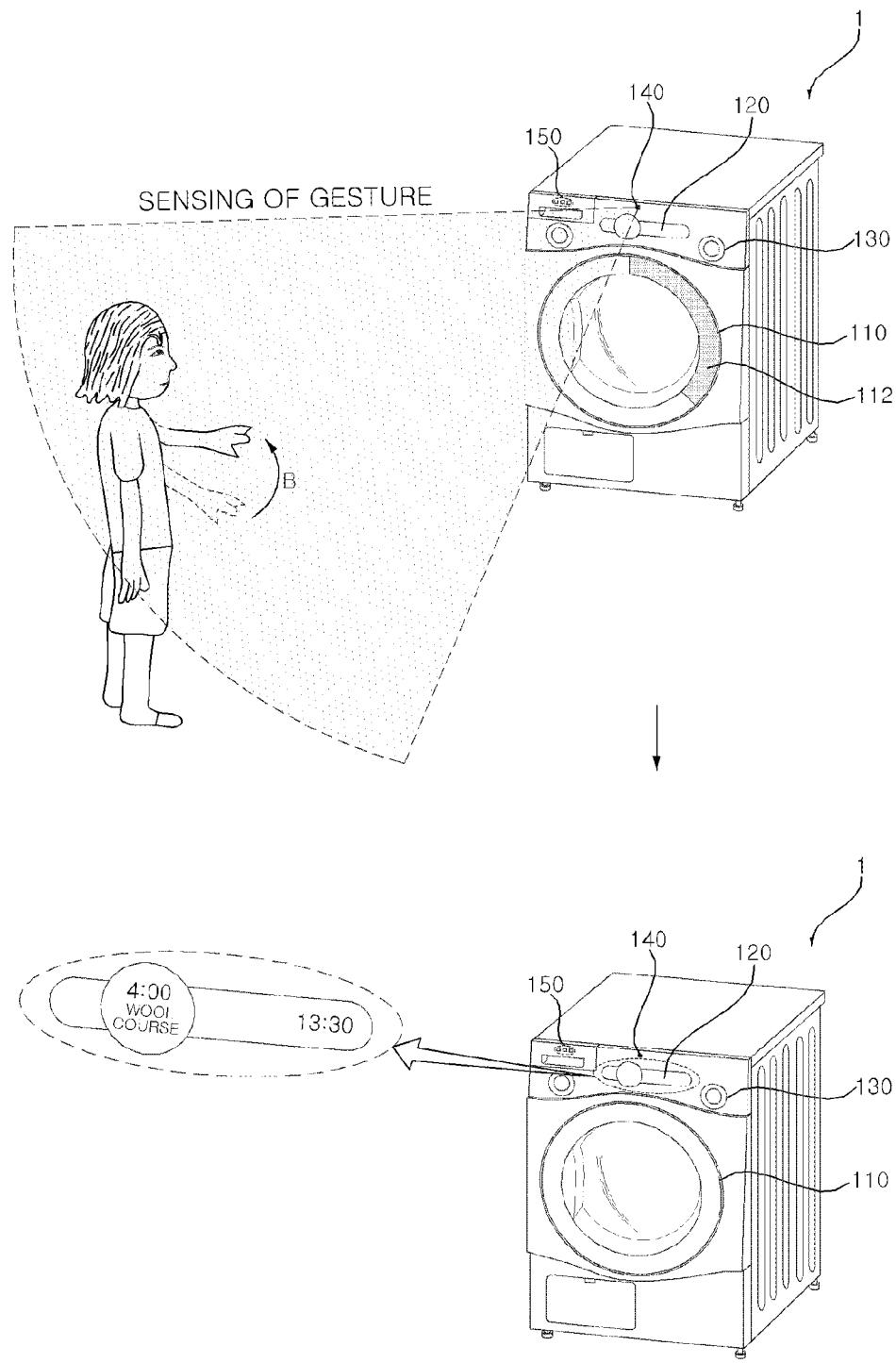

[Fig. 7]
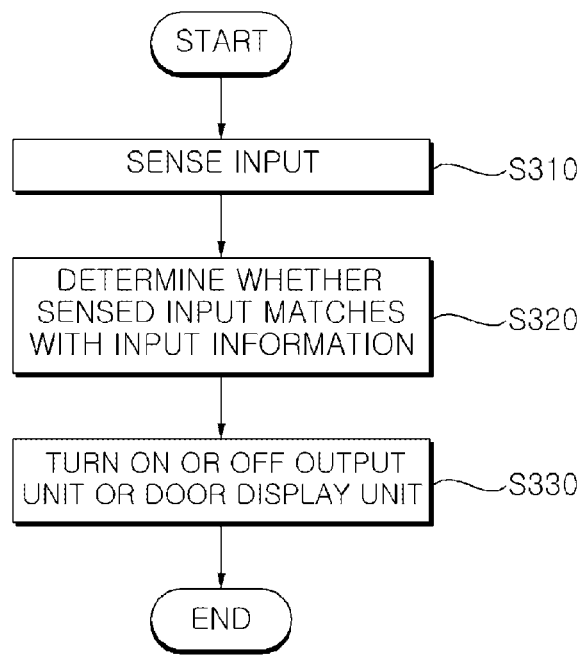

WASHING MACHINE AND CONTROL METHOD THEREOF

This application is a 35 USC § 371 National Stage entry of International Application No. PCT/KR2013/012247 filed on Dec. 27, 2013, which claims priority to Korean Application No. 10-2012-0156992 filed on Dec. 28, 2012, each of which is hereby incorporated by reference in its entirety.

TECHNICAL FIELD

The present invention relates to a washing machine and a control method thereof.

BACKGROUND ART

In general, a laundry treatment apparatus includes a washing machine, a drying machine, and a washing and drying machine.

The washing machine is an apparatus that performs washing, rinsing, and spin-drying to remove contaminants from laundry, such as clothes and bedclothes, using water, detergent, and mechanical action. The washing machine is classified as a top load type washing machine in which a drum, in which laundry is placed, is rotated about a vertical shaft or a front load type washing machine in which a drum, in which laundry is placed, is rotated about a horizontal shaft.

The drying machine is an apparatus that supplies hot air to clothes to be dried to dry the clothes. In the drying machine, clothes to be dried are introduced into a rotary drum and hot air or cool air is supplied into the drum to dry the clothes.

The washing and drying machine is an apparatus having both a washing function and a drying function. In the washing and drying machine, laundry, such as clothes, is introduced into a rotary drum and a desired function is selected to wash or dry the laundry.

The laundry treatment apparatus may have a door to open and close a drum, in which laundry, such as clothes, is placed. In the busy life of today, it is important for a washing machine to provide the remaining time of a washing operation. Various researches have been conducted into washing machines configured to intuitively provide users with the remaining time of a washing operation.

DISCLOSURE OF INVENTION

Technical Problem

It is an object of the present invention to provide a washing machine that is capable of intuitively providing a user with a progress degree of a washing operation and a control method thereof.

Solution to Problem

In accordance with an aspect of the present invention, the above and other objects can be accomplished by the provision of a washing machine including a sensing unit to sense various kinds of inputs, an output unit to display an operation state of the washing machine, a door display unit disposed at a door to display a light pattern, a memory to store a plurality of input information corresponding to a plurality of commands, and a controller to determine whether the sensed input matches with any one of the input information when the sensing unit senses an external input and control at least one of the output unit and the door display unit to be driven in response to the matched input information.

In accordance with another aspect of the present invention, there is provided a control method of a washing machine including sensing an external input, when the external input is sensed, determining whether the sensed external input matches with any one of a plurality of prestored input information, and, when the external input matches with any one of the input information, alternately turning on/off an output unit and a door display unit to display washing information based on the matched input information.

Advantageous Effects of Invention

In a washing machine according to an embodiment of the present invention and a control method thereof, it is possible to intuitively provide a user with a progress degree of a washing operation.

In a washing machine according to an embodiment of the present invention and a control method thereof, a door display unit displays a progress degree of a washing operation at the edge of a door. Consequently, it is possible for a user to easily check the progress degree of the washing operation even when the user is far from the washing machine by a predetermined distance.

In a washing machine according to an embodiment of the present invention and a control method thereof, it is possible to recognize a gesture or voice of a user and to execute a command corresponding thereto, whereby it is possible for the user to conveniently check a progress degree or the remaining time of a washing operation.

In a washing machine according to an embodiment of the present invention and a control method thereof, it is possible to operate a door display unit or end the operation of the door display unit by sensing external movement or an external voice such that a user intuitively feels that the washing machine has correctly sensed a command issued by the user.

In a washing machine according to an embodiment of the present invention and a control method thereof, a door display unit is disposed at the central part of a door to display a progress degree or the remaining time of a washing operation using text or a picture. Consequently, it is possible for a user to check correct information from a long distance.

BRIEF DESCRIPTION OF DRAWINGS

The above and other objects, features and other advantages of the present invention will be more clearly understood from the following detailed description taken in conjunction with the accompanying drawings, in which:

FIG. 1 is a perspective view showing a washing machine according to an embodiment of the present invention;

FIG. 2 is a block diagram showing components of the washing machine according to the embodiment of the present invention;

FIGS. 3 to 6 are views showing control states of the washing machine according to the embodiment of the present invention; and FIG. 7 is a flowchart showing a control method of a washing machine according to an embodiment of the present invention.

BEST MODE FOR CARRYING OUT THE INVENTION

Advantages and features of the present invention and a method of achieving the same will be more clearly understood from embodiments described below with reference to the accompanying drawings. However, the present invention is not limited to the following embodiments but may be implemented in various different forms. The embodiments are provided merely to complete disclosure of the present invention and to fully provide a person having ordinary skill in the art to which the present invention pertains with the category of the invention. The invention is defined only by the category of the claims. Wherever possible, the same reference numbers will be used throughout the specification to refer to the same or like parts.

Terms 'first', 'second', etc. may be used to describe various elements. However, these elements are not restricted by such terms. These terms are used to distinguish between one element and another element. For example, first contact may be referred to as second contact without departing from the scope of the present invention. In the same manner, second contact may be referred to as first contact. The first contact and the second contact may be both contact but not the same contact.

Terms used in the description of the invention are provided only to explain specific embodiments but are not intended to restrict the invention. In the description of the invention and the accompanying claims, the singular forms are intended to include the plural forms as well, unless context clearly indicates otherwise. The use of marks may indicate any one or both of the singular forms and the plural forms of the terms, and vice versa.

It will be understood that the term "and/or" refers to one or more possible combinations of specified relevant items and includes such combinations. It will be further understood that the terms "comprises" or "comprising" used in this specification designate presence of specified features, integers, steps, operations, elements, and/or components but do not exclude presence or addition of one or more other features, integers, steps, operations, elements, components, and/or groups thereof.

The term "if" may be interpreted to mean "when" or "upon" or "in response to determining" or "in response to detecting" from the context. In the same manner, the phrases "in a determined case" or "when [a specified condition or event] is detected" may be interpreted to mean "upon determining", "in response to determining", "upon detecting [a specified condition or event]" or "in response to detecting [a specified condition or event]" from the context.

Reference will now be made in detail to the preferred embodiments of the present invention, examples of which are illustrated in the accompanying drawings. Hereinafter, a washing machine, which is a kind of laundry treatment apparatus, will be described by way of example. However, embodiments of the present invention are not limited thereto. For example, idea of the present invention may be applied to other laundry treatment apparatuses, such as a washing machine with a steam spray function, a drying and washing machine, and a drying machine.

FIG. 1 is a perspective view showing a washing machine according to an embodiment of the present invention.

Referring to FIG. 1, a washing machine 1 according to an embodiment of the present invention may include a case forming the external appearance of the washing machine 1 and a drum rotatably provided in the case to receive laundry, such as clothes. At the inner circumference of the drum are provided lifters to lift and drop the laundry according to rotation of the drum.

The case may be provided at the front thereof with a laundry introduction port, through which laundry is introduced into the drum. The case may be provided at the upper part of the front thereof with an output unit 120 to display various kinds of information regarding an operation state of the washing machine. The output unit 120 may include a light source, such as liquid crystal display (LCD) or light emitting diodes (LEDs), to display control information of the washing machine. However, embodiments of the present invention are not limited thereto.

A door 110 may be mounted at the laundry introduction port. The door 110 may open and close the laundry introduction port, which is an entrance through which laundry is introduced into the drum. The door 110 may be manually manipulated by a user or may be operated under electronic control. The door 110 may be rotatably connected to the case.

The door 110 may include a door display unit to display information regarding various operations of the washing machine. The door display unit may display a light pattern at the edge of the door 110. The door display unit may display information regarding various operations of the washing machine at the center of the door 110.

An input unit 130 may be disposed at the front of the case. In FIG. 1, the input unit 130 is shown as a mechanical button manipulated by user touch. However, embodiments of the present invention are not limited thereto. The input unit 130 may be a voice recognition sensor (not shown) to recognize a voice or a touchscreen formed together with the input unit 120. However, embodiments of the present invention are not limited thereto.

The input unit 130 may include a light source. The input unit 130 may be a light pattern emitting light in a specific shape. The input unit 130 may display a plurality of light patterns. However, embodiments of the present invention are not limited thereto.

For example, the input unit 130 may display a ring shaped light pattern. The input unit 130 may divide the ring shaped light pattern into upper and lower light patterns to separately emit the upper and lower light patterns. The input unit 130 may display an upper semi ring shaped light pattern and a lower semi ring shaped light pattern. For example, the input unit 130 may be a mechanical or touch button.

The input unit 130 may receive various control commands from a user, such as course setting, operation time setting, and schedule setting, related to operation of the washing machine.

For example, the input unit 130 may include a dial rotatable to select a desired operation or a touch/push button. However, embodiments of the present invention are not limited thereto.

A sensing unit 140 may be disposed at the front of the case. The sensing unit 140 may sense approach or movement of any object. The sensing unit 140 may measure the distance from the object. For example, the sensing unit 140 may include a laser sensor, an ultrasonic sensor, or an infrared sensor. However, embodiments of the present invention are not limited thereto.

The sensing unit 140 may have a semicircular sensing range about a position at which the sensing unit 140 is provided. The semicircle may have a radius of about 30 cm. However, embodiments of the present invention are not limited thereto.

The washing machine 1 may include a speaker 150. The speaker 150 may output various kinds of information. The speaker 150 may aurally output an operation mode, operation time, weather information, etc. However, embodiments of the present invention are not limited thereto.

FIG. 2 is a block diagram showing components of the washing machine according to the embodiment of the present invention.

A controller 210 may control operation of the washing machine. The controller 210 may transmit and receive control signals to and from other components of the washing machine. The controller 210 may transmit signals to the other components of the washing machine to control the other components of the washing machine.

The controller 210 may display data stored in a memory 220 through an output unit 260 or execute a program stored in the memory 220 to process the data.

The memory 220 may include a high-speed random access memory. The memory 220 may include a nonvolatile memory, such as a magnetic disc storage device, a flash memory device, or another nonvolatile solid memory device. However, embodiments of the present invention are not limited thereto. The memory 220 may include a readable storage medium.

For example, the memory 220 may include an electronically erasable and programmable read only memory (EEPROM). However, embodiments of the present invention are not limited thereto. Recording of information into EEPROM or removal of information from EEPROM may be performed under control of the controller 210. EEPROM may be a memory device that is capable of retaining information stored therein even when the washing machine is powered off and thus supply of power to EEPROM is interrupted.

The memory 220 may store various kinds of programs and data in cooperation with the controller 210. The programs stored in the memory 220 may be executed by the controller 210.

The memory 220 may store a plurality of input information corresponding to a plurality of commands. The washing machine may perform a plurality of washing operations. For example, the washing machine may perform a washing operation, such as wool washing, normal washing, spin-drying, or drying. However, embodiments of the present invention are not limited thereto.

The input information may include voice information or gesture information corresponding to various kinds of commands. For example, the input information may match with a gesture or voice sensed by a sensing unit 230.

The washing machine may execute commands corresponding to the washing operations. The controller 210 may compare the input information corresponding to the commands stored in the memory 220 with information sensed by the sensing unit 230.

The controller 210 may determine whether the input sensed by the sensing unit 230 matches with any one of the input information. Upon determining that the matched input information is present, the controller 210 may control the output unit 260 or a door display unit 250 to be driven in response to the matched input information.

The controller 210 may alternately turn on or off the door display unit 250 and the output unit 260 and may display the output unit 260 or the door display unit 250, if turned on, in a light pattern.

The controller 210 may alternately activate or deactivate the output unit 260 and the door display unit 250 based on the input information corresponding to the input sensed by the sensing unit 230.

In a plurality of embodiments of the present invention, which will hereinafter be described, the controller 210 may determine a matching relationship between a gesture or voice sensed by the sensing unit 230 and the input information. However, embodiments of the present invention are not limited thereto. For example, an object matched with the input information may be input through an input unit 240.

The input information may include first input information to turn off the output unit 260 and turn on the door display unit 250 and second input information to turn on the output unit 260 and turn off the door display unit 250.

When the gesture or voice sensed by the sensing unit 230 matches with the first input information, the controller 210 may turn off the output unit 260 and turn on the door display unit 250. When the gesture or voice sensed by the sensing unit 230 matches with the second input information, the controller 210 may turn on the output unit 260 and turn off the door display unit 250.

The sensing unit 230 may sense a gesture of an object or a voice. The sensing unit 230 may include at least one of an object sensor to sense movement of an object and a voice sensor to sense an external voice.

When the sensing unit 230 is an object sensor to sense movement of an object, the object sensor may sense a gesture of the object within a predetermined distance. Upon sensing the movement of the object, the object sensor may transmit the sensed result to the controller 210. The object sensor may include at least one selected from an ultrasonic sensor, a laser sensor, and an infrared sensor. However, embodiments of the present invention are not limited thereto.

In another embodiment, the sensing unit 230 may be a touch sensor to sense whether the case forming the external appearance of the washing machine has been touched. The sensing unit 230 may sense whether the washing machine has been touched and the controller 210 may check and execute a command including the information sensed by the sensing unit 230. However, embodiments of the present invention are not limited thereto. The touch sensor may be any one selected from among an acceleration sensor to sense vibration, a sensor to sense static electricity, and a pressure sensor to sense pressure. However, embodiments of the present invention are not limited thereto.

In another embodiment, the sensing unit 230 may include a camera. When the sensing unit 230 includes a camera, the camera may continuously capture a predetermined range in the vicinity of the washing machine. The sensing unit 230 may transmit images captured by the camera to the controller 210. The controller 210 may analyze movement of a user contained in the images to check and execute a command.

The sensing unit 230 may include a voice recognition sensor (not show) to sense a voice. The sensing unit 230 may sense a voice of a user and transmit the sensed result to the controller.

In another embodiment, a plurality of sensing units 230 may be provided. The sensing units 230 may include a plurality of sensors selected from among the ultrasonic sensor, the infrared sensor, the laser sensor, the vibration sensor, the touch sensor, and the camera. However, embodiments of the present invention are not limited thereto.

The input unit 240 may include a plurality of buttons or a touch panel. However, embodiments of the present invention are not limited thereto. A plurality of input units 240 may be provided. The input unit 240 may include a light source to display a light pattern. When the input unit 240 includes a plurality of buttons, the buttons may display a command to be executed or an operation state in a light pattern. However, embodiments of the present invention are not limited thereto.

The input unit 240 may indicate operation of the washing machine or control a degree of various operations.

In FIG. 2, the input unit 240 and the sensing unit 230 are separately provided. However, the input unit 240 and the sensing unit 230 may be integrated and the sensing unit 230 may be an inclusive concept to allow various kinds of inputs. For example, the sensing unit 230 may include a mechanical button or a touch pad in addition to a sensor to sense a gesture or a voice.

The door may open and close the entrance of the drum, through which laundry is introduced. The door may be formed in various shapes. The door may include a door display unit 250 to display at least one light pattern disposed at the edge or center of the outside thereof.

The edge of the door may be formed in various shapes. For example, the door may be formed in a quadrangular shape or a circular shape. However, embodiments of the present invention are not limited thereto.

The door display unit 250 may include a light source and a light guide member to guide light generated from the light source such that light uniformly emits over the edge of the light source. However, embodiments of the present invention are not limited thereto.

The door display unit 250 may display various kinds of information related to operation of the washing machine. The door display unit 250 may include an edge part 252 disposed at the flange of the door and/or a central part 254.

The door display unit 250 may include a light source (not shown) to emit light, a light guide part to guide the light emitted by the light source, and a liquid crystal display panel (not shown) to display an image using the light provided from the light guide part. However, embodiments of the present invention are not limited thereto.

In another embodiment, the door display unit 250 may include an organic light emitting diode (OLED), which is a surface light source. However, embodiments of the present invention are not limited thereto.

When the door display unit is turned on, the controller may display a progress degree of a washing operation using an area of the light pattern displayed by the door display unit. For example, the door display unit may display a progress degree of a washing operation through an area of the light pattern displayed by the edge part 252.

When the door display unit is deactivated, the output unit may display progress information of the washing operation using text. When the door display unit is activated, the output unit may display a progress degree of a washing operation through an area of the light pattern displayed by the edge part 252 such that a user intuitively checks a progress degree of the washing operation.

The edge part 252 and the central part 254 may display different kinds of information. For example, the edge part 252 may display a progress degree of the washing operation using a moving light pattern (animation) and the central part 254 may display information different from that displayed by the edge part 252 using text or a picture. However, embodiments of the present invention are not limited thereto. For example, the edge part may display a progress degree of the washing operation in a clockwise direction or in a counterclockwise direction with respect to 12 o'clock in different phases.

The edge part 252 and the central part 254 may be a conceptual component in which one display device is divided into two parts or two display devices different from each other. However, embodiments of the present invention are not limited thereto.

The output unit 260 may display various kinds of information of the washing machine. The output unit 260 may include a display unit 262 to visually display information of the washing machine and a speaker 264 to aurally display information of the washing machine. However, embodiments of the present invention are not limited thereto.

A communication unit (not shown) may transmit and receive a signal to and from the controller 210. The communication unit (not shown) may receive various kinds of information from an external server. For example, the communication unit (not shown) may receive weather information from the external server and transit the received weather information to the controller.

A position sensor (not shown) may sense a current position of the washing machine. For example, the position sensor (not shown) may include a global position system (GPS) module. The position sensor (not shown) may communicate with a plurality of GPS artificial satellites to sense a current position of the washing machine.

FIGS. 3 to 6 are views showing control states of the washing machine according to the embodiment of the present invention.

Referring to FIG. 3, the washing machine according to the embodiment may include a sensing unit 140 to sense various kinds of inputs, an output unit 120 to display an operation state of the washing machine, a door display unit 112 to display a light pattern, a memory (not shown) to store a plurality of input information corresponding to a plurality of commands, and a controller (not shown) to determine whether the sensed input matches with any one of the input information when the sensing unit 140 senses an external input, and control the output unit 120 or the door display unit 112 to be driven in response to the matched input information.

The output unit 120 may display various kinds of information regarding a washing operation. In the embodiment shown in FIG. 3, the output unit 120 displays washing operation type, the remaining time, and current time. However, embodiments of the present invention are not limited thereto.

The sensing unit 140 may sense a predetermined range from a position where the sensing unit 140 is mounted. For example, the sensing unit 140 may sense a gesture or voice of a user. The sensing unit 140 may transmit the sensed information to the controller (not shown). The controller (not shown) may determine whether the information sensed by the sensing unit 140 matches with any one of the input information stored in the memory (not shown).

When the information sensed by the sensing unit 140 matches with any one of the input information, the controller (not shown) may turn on or off the output unit 120 or the door display unit 112 based on the matched input information.

When the sensing unit 140 is an object sensor to sense a gesture of an object, the sensing unit 140 may sense a predetermined range in front of the washing machine 1. When the sensing unit 140 is a voice sensor to sense a voice, the sensing unit 140 may sense a voice having a predetermined volume or higher. However, embodiments of the present invention are not limited thereto.

In the embodiment shown in FIG. 3, the sensing unit 140 may sense a gesture A of a user. For example, when the user makes a gesture A of putting a hand down, the sensing unit 140 may sense the gesture and transmit the sensed gesture to the controller (not shown).

The controller (not shown) may determine whether the gesture A recognized by the sensing unit 140 matches with any one of the input information stored in the memory (not shown).

Upon finding input information matched with the gesture A recognized by the sensing unit 140, the controller (not shown) may turn on one of the output unit 120 and the door display unit 112 and turn off the other based on the input information.

The input information may include first input information to turn off the output unit 120 and turn on the door display unit 112 and second input information to turn on the output unit 120 and turn off the door display unit 112.

For example, when the gesture A recognized by the sensing unit 140 matches with the first input information, the controller (not shown) may turn off the output unit 120 and turn on the door display unit 112.

Upon receiving an operation signal from the controller (not shown), turning-on of the door display unit 112 may be displayed using a light pattern, for example light animation. The light pattern may include various shapes of light. For example, the door display unit 112 may display a light pattern moving from 12 o'clock in a clockwise direction at the edge of the door 110 to indicate turning-on of the door display unit 112. In another embodiment, the door display unit 112 may flicker a ring shaped light pattern at the flange of the door 110 for a predetermined time. However, embodiments of the present invention are not limited thereto.

The door display unit 112 may include an edge part disposed at the flange of the door. When the door display unit 112 is turned on, the edge part may display a rotating light pattern to indicate that the door display unit 112 has been turned on.

In another embodiment, the door display unit 112 may display a circularly rotating light pattern and then blink a ring shaped light pattern several times.

Referring to FIG. 4, a door display unit 112 and 114 may include a central part 114 disposed at the center of the door 110 and an edge part 112 disposed at the flange of the door 110.

The edge part 112 and the central part 114 may be a conceptual component in which one display device is divided into two parts or two display devices different from each other. However, embodiments of the present invention are not limited thereto.

The central part 114 may display text information. For example, the central part 114 may display type or remaining time of a washing operation using text. However, embodiments of the present invention are not limited thereto.

The edge part 112 may display a progress degree of the washing operation using a light pattern. The edge part 112 may display a ring shaped light pattern. Alternatively, the edge part 112 may fill the ring according to the progress degree of the washing operation.

For example, the edge part 112 may display a light pattern from 12 o'clock to a phase angle corresponding to the progress degree of the washing operation. For example, when about a half of the washing operation has been progressed, the edge part 112 may display a right side semi-ring light pattern from 12 o'clock to 6 o'clock. When about ⅓ of the washing operation has been progressed, the edge part 112 may display a light pattern having an angle of 120 degrees from 12 o'clock.

Referring to FIG. 5, the controller (not shown) may turn on or off the output unit 120 or the door display unit 112 and 114 based on the input sensed by the sensing unit 140.

The sensing unit 140 may sense an external input. In the embodiment shown in FIG. 5, the sensing unit 140 senses a gesture B of a user. However, embodiments of the present invention are not limited thereto. For example, the sensing unit 140 senses a voice.

The controller (not shown) may determine whether the gesture B recognized by the sensing unit 140 matches with any one of the input information stored in the memory (not shown).

Upon finding input information matched with the gesture B recognized by the sensing unit 140, the controller (not shown) may turn on one of the output unit 120 and the door display unit 112 and 114 and turn off the other based on the input information.

The input information may include first input information to turn off the output unit 120 and turn on the door display unit 112 and 114 and second input information to turn on the output unit 120 and turn off the door display unit 112 and 114.

For example, when the gesture B recognized by the sensing unit 140 matches with the second input information, the controller (not shown) may turn on the output unit 120 and turn off the door display unit 112 and 114.

Upon receiving an operation signal from the controller (not shown), turning-on of the output unit 120 may be displayed using animation. For example, when the output unit 120 is turned on, a light pattern reciprocating from side to side may be displayed. However, embodiments of the present invention are not limited thereto. Turning-on of the output unit 120 may be displayed using various methods.

When the output unit 120 is turned on, the remaining time or type of a washing operation may be displayed. However, embodiments of the present invention are not limited thereto.

Referring to FIG. 6, the input unit 130 may be turned on/off together with the output unit 120.

The input unit 130 may display a light pattern. For example, the input unit 130 may display a ring shaped or semi ring shaped light pattern.

The sensing unit 140 may sense an external input. In the embodiment shown in FIG. 6, the sensing unit 140 senses a gesture B of a user. However, embodiments of the present invention are not limited thereto. For example, the input sensed by the sensing unit 140 may be a gesture or a voice.

The controller (not shown) may determine whether the gesture B recognized by the sensing unit 140 matches with any one of the input information stored in the memory (not shown).

Upon finding input information matched with the gesture B recognized by the sensing unit 140, the controller (not shown) may turn on one of the output unit 120 and the door display unit 112 and turn off the other based on the input information.

The input information may include first input information to turn off the output unit 120 and turn on the door display unit 112 and second input information to turn on the output unit 120 and turn off the door display unit 112.

For example, when the gesture B recognized by the sensing unit 140 matches with the second input information, the controller (not shown) may turn on the output unit 120 and turn off the door display unit 112.

Upon receiving an operation signal from the controller (not shown), turning-on of the output unit 120 may be displayed using animation. For example, when the output unit 120 is turned on, a light pattern reciprocating from side to side may be displayed. However, embodiments of the present invention are not limited thereto. Turning-on of the output unit 120 may be displayed using various methods.

When the output unit 120 is turned on, the remaining time or type of a washing operation may be displayed. However, embodiments of the present invention are not limited thereto.

A plurality of input units 130 may be provided. For example, the input units 130 may be disposed at the left and right upper ends of the case. For example, when the output unit 120 is operated, the input unit 130 may display turning-on of the output unit 120 using a light pattern.

FIG. 7 is a flowchart showing a control method of a washing machine according to an embodiment of the present invention.

Referring to FIG. 7, the control method of the washing machine according to the embodiment of the present invention includes a step of sensing, by a sensing unit, an external input (S310), a step of, determining whether the sensed external input matches with any one of a plurality of prestored input information, when the external input is sensed (S320), and a step of, turning on/off an output unit and a door display unit alternately to display washing information based on the matched input information, when the external input matches with any one of the input information (S330).

At the step of sensing the external input (S310), the external input may be received using a sensor, a touch pad, or a mechanical button. For example, a sensor to sense a gesture of an object or a voice may sense the surroundings of the washing machine. The external input may be a concept including various embodiments, such as a gesture and voice of a user and mechanical input.

When the external input is sensed, the controller may determine whether the sensed gesture or voice matches with input information stored in the memory (S320). The input information may include a matching relationship between a command to control the washing machine and the gesture or the voice.

Upon checking the input information matched with the input sensed by the sensing unit, the controller may perform control based on the matched input information. The controller may alternately turn on/off the output unit and the door display unit to display washing information based on the matched input information (S330).

At the step of turning on/off the output unit or the door display unit, turning-on/off of the output unit or the door display unit may be displayed using animation.

The control method of the washing machine according to the embodiment of the present invention may further include a step of checking a progress degree of a washing operation and a step of displaying the progress degree of the washing operation. The controller may check the progress degree of the washing operation. The controller may display the progress degree of the washing operation through the output unit or the door display unit. The door display unit or the output unit may display the progress degree of the washing operation using text or a pattern.

The door display unit may display a light pattern from 12 o'clock to a phase angle corresponding to the progress degree of the washing operation at the edge of the door.

The control method of the washing machine according to the embodiment of the present invention may further include a step of measuring the distance from an object. At the step of sensing the external input, when the external input is a gesture of a user, the size of the gesture that the input unit senses may be changed based on the distance from the object. For example, the sensing unit may sense the distance from the user. The controller may change a degree in size of a gesture or voice sensed by the sensing unit based on the distance from the user.

For example, when the distance between the user and the washing machine is out of a predetermined distance range, the sensed gesture or voice may be recognized even if the size of the gesture or the voice is small. For example, when the distance between the user and the washing machine is within the predetermined distance range, the controller may ignore the sensed gesture or voice if the size of the gesture or the voice is small.

Although all elements constituting the embodiments of the present invention are described to be integrated into a single one or to be operated as a single one, the present invention is not necessarily limited to such embodiments. According to embodiments, all of the elements may be selectively integrated into one or more and be operated as one or more within the object and the scope of the present invention.

Each of the elements may be implemented as independent hardware. Alternatively, some or all of the elements may be selectively combined into a computer program having a program module performing some or all functions combined in one or more pieces of hardware.

A plurality of codes and code segments constituting the computer program may be easily reasoned by those skilled in the art to which the present invention pertains. The computer program may be stored in a computer readable media such that the computer program is read and executed by a computer to implement embodiments of the present invention. Computer program storage media may include magnetic recording media, optical recording media, and carrier wave media.

The term "comprises", "includes", or "has" described herein should be interpreted not to exclude other elements but to further include such other elements since the corresponding elements may be inherent unless mentioned otherwise.

All terms including technical or scientific terms have the same meanings as generally understood by a person having ordinary skill in the art to which the present invention pertains unless mentioned otherwise.

Generally used terms, such as terms defined in a dictionary, should be interpreted to coincide with meanings of the related art from the context. Unless obviously defined in the present invention, such terms are not interpreted as ideal or excessively formal meanings.

Although the preferred embodiments of the present invention have been disclosed for illustrative purposes, those skilled in the art will appreciate that various modifications, additions and substitutions are possible without departing from the scope and spirit of the invention as disclosed in the accompanying claims.

The embodiments disclosed in the present invention are provided not to limit the technical concept of the present invention but to illustrate the technical concept of the present invention. Therefore, the scope of the technical concept of the present invention is not limited by such embodiments. The scope of the protection of the present invention should be determined by reasonable interpretation of the appended claims and all technical concepts coming within the equivalency range of the present invention are should be interpreted to be embraced in the scope of the right of the present invention.

INDUSTRIAL APPLICABILITY

In a washing machine according to an embodiment of the present invention and a control method thereof, it is possible to intuitively provide a user with a progress degree of a washing operation. Consequently, the present invention has industrial applicability.

The invention claimed is:

1. A washing machine comprising:
   a case having a port at a front thereof;
   a door mounted at the case to open and close the port;
   an object sensor disposed at the front of the case to sense a gesture of an object within a predetermined distance;
   an output unit disposed at the front of the case to display an operation state of the washing machine;
   a door display unit disposed at the door to display a light pattern;
   a memory to store a plurality of input information corresponding to a plurality of gestures; and
   a controller to determine whether the gesture, sensed by the object sensor, matches with any one of the input information, and control at least one of the output unit and the door display unit to be driven in response to the matched input information, wherein:
      the input information comprises a first input information and a second input information,
      when the gesture sensed by the object sensor corresponds to the first input information, the controller turns on the door display unit and turns off the output unit, and the controller displays the progress degree of the washing operation using an area of the light pattern displayed by the door display unit, and
      when the gesture sensed by the object sensor corresponds to the second input information, the controller turns off the door display unit and turns on the output unit, and the controller displays washing operation information regarding the washing operation using text by the output unit.

2. The washing machine according to claim 1, wherein turning-on of the output unit or the door display unit is displayed using the light pattern on the door display unit.

3. The washing machine according to claim 1, wherein
   the door display unit comprises an edge part disposed at an edge of the door, and
   the edge part displays the progress degree of the washing operation in a clockwise direction or in a counterclockwise direction with respect to 12 o'clock in different phases.

4. The washing machine according to claim 1, wherein
   the door display unit comprises an edge part disposed at an edge of the door, and
   when the door display unit is turned on, the edge part displays a rotating light pattern to indicate that the door display unit has been turned on.

5. The washing machine according to claim 1, wherein
   the door display unit comprises a central part disposed at a center of the door,
   when the door display unit is turned on, the central part displays the washing operation information using text, and
   the washing operation information comprises information regarding a course, which is a kind of washing operation, or the remaining time.

6. The washing machine according to claim 1, further comprising:
   a plurality of input units to receive a user command,
   wherein the input units are turned on/off in response to turning-on/off of the output unit.

7. A control method of a washing machine comprising:
   sensing, by an object sensor, a gesture of an object within a predetermined distance;
   determining whether the sensed gesture matches with any one of a plurality of pre-stored input information, when the gesture is sensed;
   turning on a door display unit and turning off an output unit, when the sensed gesture corresponds to a first input information among the plurality of pre-stored input information,
   wherein the door display unit displays a progress degree of a washing operation using an area of a light pattern; and
   turning off the door display unit and turning on the output unit, when the sensed gesture corresponds to a second input information among the plurality of pre-stored input information,
   wherein the output unit displays washing operation information regarding the washing operation using text.

8. The control method according to claim 7, wherein the turning on/off the output unit or the door display unit comprises displaying turning-on/off of the output unit or the door display unit using a light pattern.

9. The control method according to claim 7, wherein the displaying the progress degree of the washing operation comprises displaying, by the door display unit, a light pattern from 12 o'clock to a phase angle corresponding to the progress degree of the washing operation at an edge of the door.

* * * * *